J. P. CARTER.

STEAK CHOPPER.

APPLICATION FILED NOV. 15, 1912.

1,121,475.

Patented Dec. 15, 1914.

2 SHEETS—SHEET 1.

Inventor

John P. Carter

Witnesses

Hugh H. Ott

C. Colwoustorf

By Victor J. Evans

Attorney

THE NORRIS PETERS CO., PHOTO-LITHO., WASHINGTON, D. C.

J. P. CARTER.

STEAK CHOPPER.

APPLICATION FILED NOV. 15, 1912.

1,121,475.

Patented Dec. 15, 1914.

2 SHEETS—SHEET 2.

Witnesses

Hugh H. Ott

C. Edmondson Jr.

Inventor

John P. Carter

By Victor J. Evans

Attorney

THE NORRIS PETERS CO., PHOTO-LITHO., WASHINGTON, D. C.

UNITED STATES PATENT OFFICE.

JOHN P. CARTER, OF KIRKSEY, SOUTH CAROLINA.

STEAK-CHOPPER.

1,121,475. Specification of Letters Patent. Patented Dec. 15, 1914.

Application filed November 15, 1912. Serial No. 731,578.

*To all whom it may concern:*

Be it known that I, JOHN P. CARTER, a citizen of the United States, residing at Kirksey, in the county of Greenwood and State of South Carolina, have invented new and useful Improvements in Steak-Choppers, of which the following is a specification.

This invention relates to meat tenderers and one of the principal objects of the invention is to provide a machine of this character embodying a pair of intermeshing toothed rollers which are connected together in a frame in such manner that they will co-act to puncture or perforate the meat and at the same time compensate for all inaccuracies in the thickness of the piece of meat or for pieces of bone.

A further object of the invention is the provision of means for preventing the meat from adhering to the toothed rollers which means also compensates for the rise and fall of the movable roller.

Further objects of this invention will appear as the following specific description is read in connection with the accompanying drawings which form a part of this application and in which:—

Figure 2:
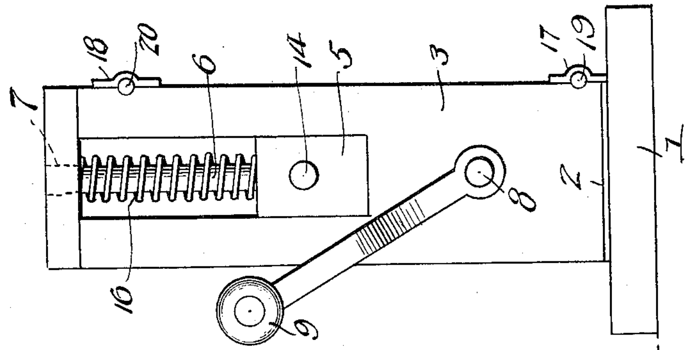
Figure 1:
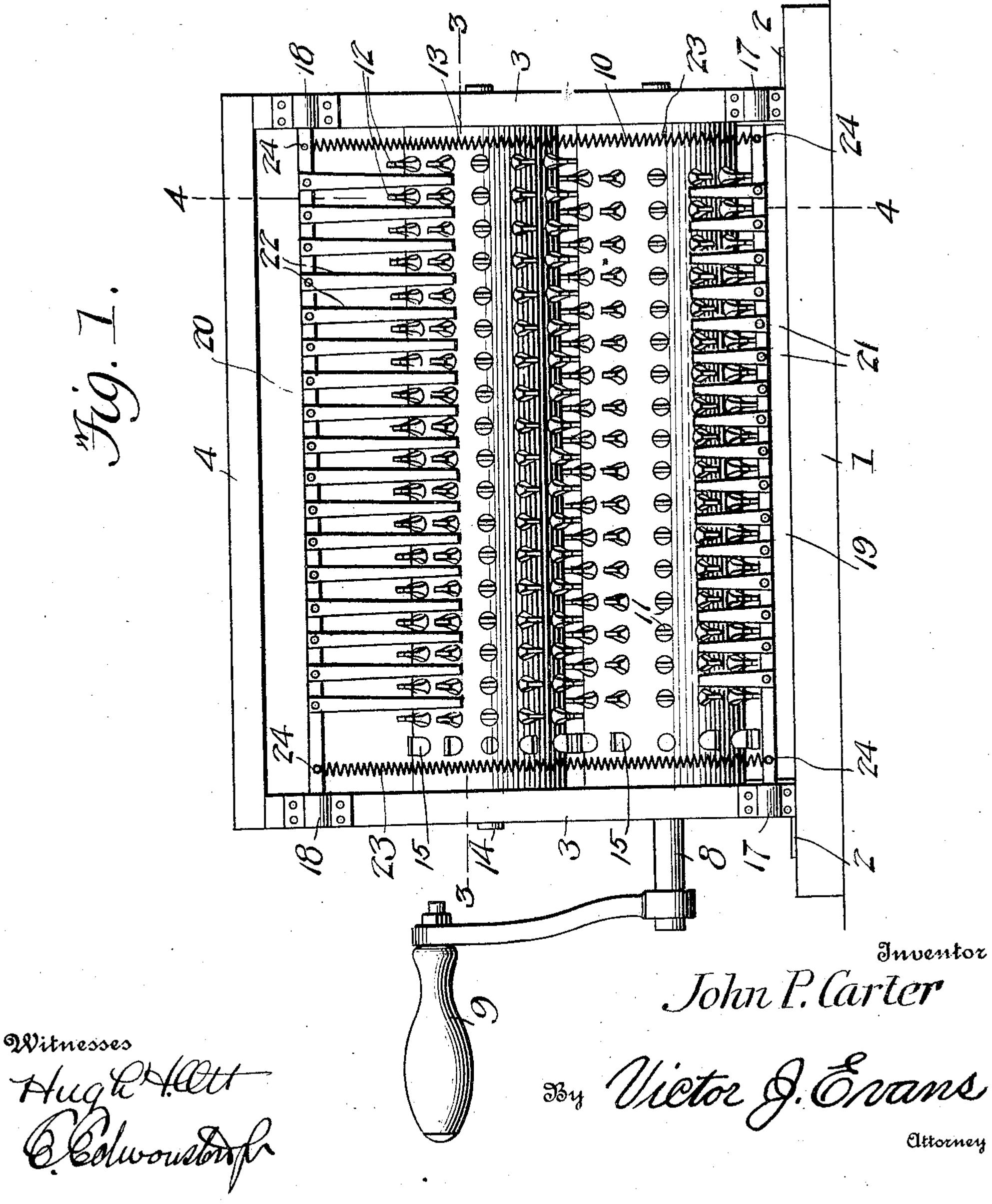
Figure 3:
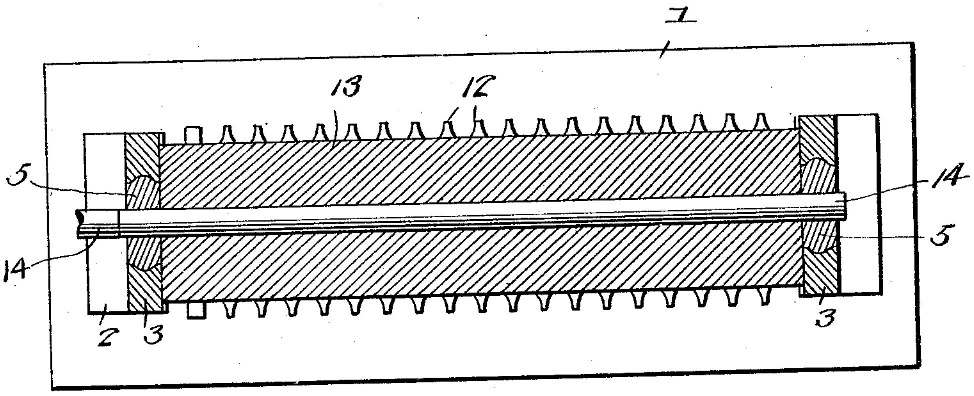
Figure 4:
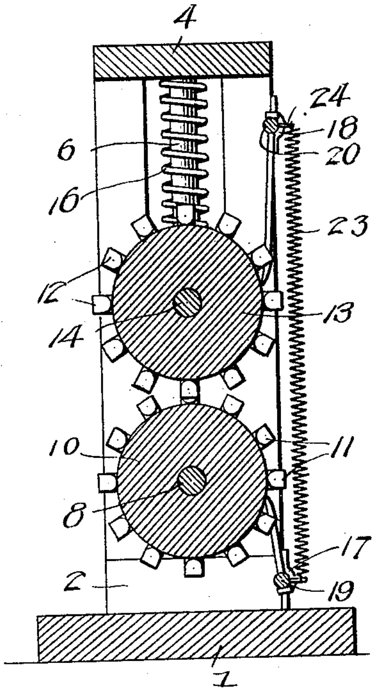

Figure 1 is a front elevation. Fig. 2 is a side elevation. Fig. 3 is a vertical sectional view taken on the line 3—3 of Fig. 1. Fig. 4 is a horizontal section taken on the line 4—4 of Fig. 2.

Referring more particularly to the drawings, 1 represents the base upon which is secured suitable brackets 2 which hold the lower ends of the uprights or standards 3 in separated position. The upper end of these standards are connected by means of a cross piece 4 and each end is vertically slotted to receive a bearing member 5 provided with a guiding extension 6 which works in an aperture 7 formed in the member 4.

Mounted in bearings carried in the standard or uprights below the base of the slots is a shaft 8 which projects considerably beyond one of the standards and is adapted to receive an operating handle 9 by which the shaft may be rotated. Keyed upon this shaft is a drum 10 having a plurality of series of laterally extending teeth 11 having their edges alined with the direction of rotation of the drum and each series being spaced from the adjoining series to receive similar but longer teeth 12 carried by a drum 13 arranged immediately above the drum 10 upon a shaft 14 journaled in the bearing member 5. Each drum is also provided with a similar series of teeth 15 having their edges arranged at right angles to the teeth 11 and 12 and adapted to mesh with each other so as to cause the rotation of the drum 13 as the drum 10 is rotated by the shaft 8.

Surrounding the extensions 6 on the bearing members 5 are spiral springs 16 which are arranged between the bearing members and the top piece 7 and serve to hold the teeth of the drum 13 in intermeshing engagement with the teeth of the drum 10 and at the same time permit the drum 13 to rise to accommodate inaccuracies in the thickness of the meat or where pieces of bone are passed between the two drums.

Revolubly mounted in bearings 17 and 18 carried upon the front of the standards 3 are shafts 19 and 20 both of which are provided with a plurality of projecting fingers 21 and 22. The fingers 21 and 22 are slightly curved at their ends to conform with the drums and lie between the teeth and against the drum as shown. These teeth are held in engagement with the drum by springs 23 which have their opposite ends connected to headed pins 24 projecting laterally from the shafts 19 and 20. The shafts however, are rotatably mounted in the bearings 17 and 18 and the fingers therefore may be thrown out of engagement with the drums when necessary.

What is claimed is:—

1. The herein described steak chopper comprising a frame including spaced uprights, a pair of intermeshing toothed rollers journaled in said uprights, rotatable shafts arranged on the front face of said uprights, means carried by the shafts and adapted to intermesh with the teeth of said adjacent rollers, pins carried by the shafts and projecting forwardly of said uprights, and springs disposed exteriorly of the frame and connecting opposite pins on opposite shafts for normally tending to rotate the pins in a direction toward each other.

2. The herein described steak chopper comprising a frame including spaced uprights, a pair of intermeshing toothed rollers journaled in said uprights, a pair of rotatable shafts arranged on the front face of said uprights, one of said shafts being disposed adjacent the top edge of the uprights, the other of said shafts being disposed adjacent the lower edge of said uprights, each of the shafts extending for the entire length of the frame and disposed in superposed relation one to the other, means carried by the shafts and adapted to intermesh with the teeth of said adjacent rollers, pins carried by the shafts, yieldable means disposed exteriorly of the frame and connecting opposite pins on opposite shafts for normally tending to rotate the pins in a direction toward each other.

3. The herein described steak chopper comprising a frame including spaced uprights, a pair of intermeshing toothed rollers journaled in said uprights, rotatable shafts journaled on the front faces of said uprights, means carried by the shafts and adapted to intermesh with the teeth of said adjacent rollers, pins carried by said shafts and disposed adjacent the opposite terminal portions thereof, the pins of one roller being disposed in vertical alinement with the pins of the other roller, and yieldable means connecting the vertically alined pins on opposite shafts for normally tending to rotate the pins in a direction toward each other.

4. The herein described steak chopper comprising a frame including spaced uprights, a pair of intermeshing toothed rollers journaled in said uprights, rotatable shafts arranged on the front face of said uprights, means carried by the shafts, and adapted to intermesh with the teeth of said adjacent rollers, pins extending outwardly from the shafts, at right angles thereto at a point to opposite sides of said means, and springs disposed exteriorly of the frame and having the opposite terminals thereof connected with the opposite pins on opposite shafts for normally tending to rotate the pins in a direction toward each other.

5. The herein described steak chopper comprising a frame including spaced uprights, a pair of intermeshing toothed rollers journaled in said uprights, rotatable shafts arranged on the front face of said uprights, means carried by the shafts and adapted to intermesh with the teeth of said adjacent rollers, pins extending outwardly from the shafts and forwardly of said uprights, and a pair of springs disposed exteriorly of the frame and each having its opposite terminals connected to opposite pins on opposite shafts for normally tending to rotate the pins in a direction toward each other.

6. The herein described steak chopper comprising a frame including a pair of spaced uprights, a pair of intermeshing toothed rollers journaled in said uprights, a pair of rotatable shafts journaled on the front faces of said uprights, means carried by the shafts and adapted to intermesh with the teeth of said adjacent rollers, pins extending outwardly from the shafts at right angles thereto and forwardly of said uprights, and a pair of springs disposed exteriorly of the frame and in a vertical plane with the front faces of the said uprights, each of said springs having its opposite terminal portions connected with opposite pins on opposite shafts for normally tending to rotate the pins toward each other.

7. The herein described steak chopper comprising a frame including a pair of spaced uprights, a pair of intermeshing toothed rollers journaled in said uprights, a pair of rotatable shafts arranged on the front face of said frame, one of said shafts being disposed longitudinally of the frame at a point adjacent the upper edge of said uprights, the other of said shafts being disposed longitudinally of the frame at a point adjacent the lower edge of said uprights, said shafts being disposed in superposed relation one to the other, means carried by the shafts and adapted to intermesh with the teeth of said adjacent rollers, pins extending outwardly from the shafts at points adjacent the opposite terminals thereof, the pins of one shaft being vertically alined with the pins of the other shaft, and a pair of springs disposed exteriorly of the frame and in vertical spaced parallel relation one to the other, the opposite terminals of each of the springs being connected with the vertically alined pins for normally tending to rotate the pins toward each other.

In testimony whereof I affix my signature in presence of two witnesses.

JOHN P. CARTER.

Witnesses:
F. S. HOLLEMAN,
W. W. BEARDEN.

Copies of this patent may be obtained for five cents each, by addressing the "Commissioner of Patents, Washington, D. C."